Aug. 10, 1965　　　　H. G. MARGETTS　　　　3,199,413
FLUID PRESSURE OPERATED SERVO-DEVICES
Filed May 29, 1963　　　　　　　　　　　　2 Sheets-Sheet 2

INVENTOR
Hugh G. Margetts
BY
Lawrence J. Winter
ATTORNEY 3,199,413
FLUID PRESSURE OPERATED SERVO-DEVICES
Hugh G. Margetts, Leamington Spa, England, assignor to Automotive Products Company Limited, Leamington Spa, England
Filed May 29, 1963, Ser. No. 284,052
Claims priority, application Great Britain, July 10, 1962, 26,514
5 Claims. (Cl. 91—372)

This invention relates to fluid pressure operated servo-devices and has for its object to provide a fluid pressure operated servo-device primarily intended for incorporation in a vehicle braking system and by means of which power assistance is available to assist the actuation of the brakes operable mechanically by the hand brake mechanism of a vehicle and upon operation of the hand brake.

A fluid pressure operated servo-device according to the invention comprises a servo-cylinder and a piston slidable in said cylinder and adapted to provide a mechanical connection between an operator actuated control and the means to be actuated thereby and a valve controlling the admission of pressure fluid to one end of said piston, said valve being arranged so as to be operable upon initial operation of the operator actuated control to admit pressure fluid to one end of the piston to assist the axial displacement of the piston effected mechanically by the actuation of the operator actuated control.

In carrying out the invention the piston of the fluid pressure operated servo-device can have coupling means at the opposite ends thereof, the coupling means at one end being connectable to the operator actuated control and the coupling at the opposite end of the piston connectable to the means to be operated, the coupling means connectable to the operator actuated control being capable of movement relative to the piston to provide lost motion upon initial movement of the operator actuated control, such lost motion being utilised to effect unseating of a valve to permit the admission of the pressure fluid to the end of the piston having the coupling means connectable to the means to be operated.

An embodiment of the invention will now be described by way of example with the aid of the accompanying drawings in which.

Figure 1:
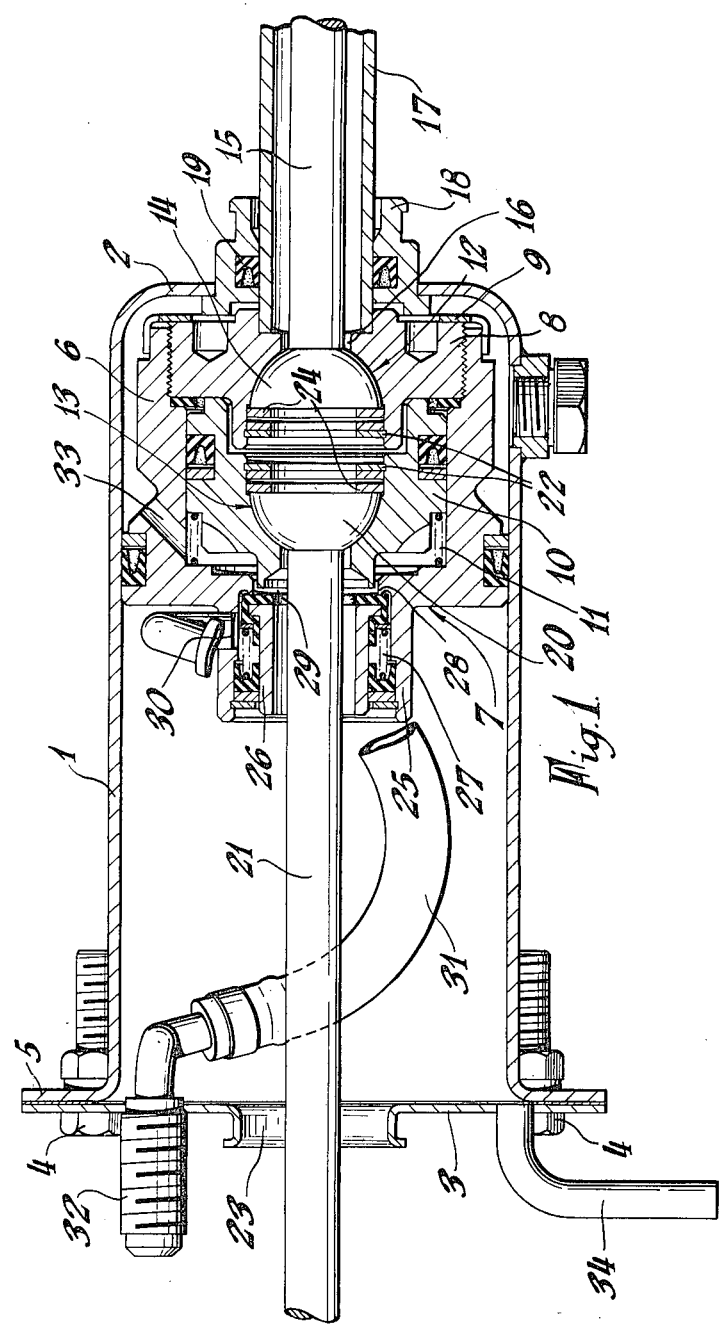
FIGURE 1 shows the servo-device in longitudinal section.
Figure 2:
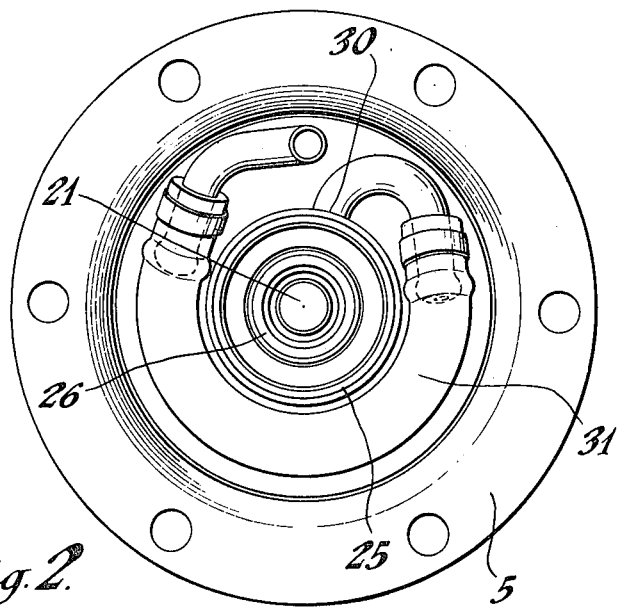
FIGURE 2 is an end view as seen from the left of FIGURE 1, the cylinder end cover being removed.
Figure 3:
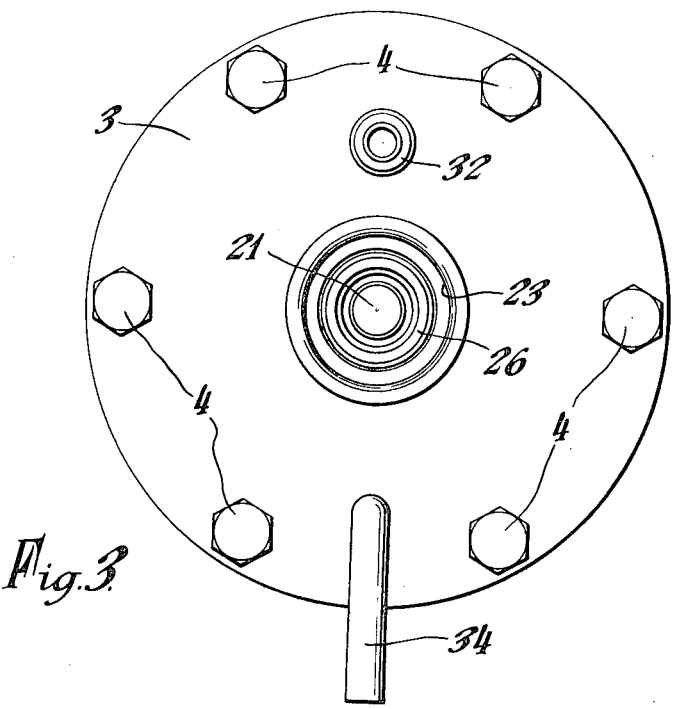
FIGURE 3 is also an end view as seen from the left of FIGURE 1, the cylinder end cover being in position.

Referring to the drawings, the servo-device comprises a servo-cylinder 1, formed for example as a metal pressing and closed at one end by and end wall 2 formed integral therewith, the opposite end being closed by a removable end closure plate 3 secured by a ring of bolts 4 to an external flange 5 on the cylinder. A piston 6 in the form of a hollow cylinder is slidably mounted in the servo-cylinder, the piston 6 being closed at one end by an end wall 7, and closed at the other end by a closure plug 8 which is screwed into the open end of the piston and secured by a locking washer 9. An annular member 10 is disposed within the interior of the piston so as to be axially slidable relative to the piston, the annular member being spring loaded by a compression spring 11 the spring action urging the annular member 10 towards the closure plug 8. The opposite faces of the closure plug 8 and annular member 10 are each provided centrally with a hemi-spherical recess 12 and 13 respectively. The recess 12 forms a seating to receive the ball shaped end 14 of a connecting rod 15 which passes through a clearance hole 16 extending through the thickness of the plug from the base of the recess to the outer end face of the plug, the outer end of the connecting rod projecting outwardly through a sleeve 17 carried by the closure plug, the sleeve extending out of the servo-cylinder 1 through the bore of a bush 18 in the cylinder end wall 2, a sealing member 19 between the bore of the bush 18 and the external periphery of the sleeve 17 producing a fluid tight joint at this end of the servo-cylinder. Similarly the recess 13 forms a seating to receive the ball shaped end 20 of a connecting rod 21 which passes through a clearance hole in the annular member 10 and through the closed end of the piston the free end of this rod projecting out of the servo-cylinder through a clearance hole 23 in the end closure plate 3. The ball shaped end of each connecting rod is retained in its recess by a spring retaining ring 22, a compression spring 24 acting between each said spring retaining ring and the appropriate ball shaped end acting to maintain each such ball on its seating. The "ball joints" formed by the co-operating ball shaped ends and recesses permit universal movement of the connecting rods.

The closed end wall 7 of the piston 6 carries a valve housing 25 which projects axially therefrom. An annular axially slidable valve 26 is disposed in the valve housing, which is spring loaded by a compression spring 27 the spring action urging the valve 26 in a direction towards the annular member 10 and against a seating 28 to close a port 29 in the closed end wall 7 of the piston 6 and isolate the interior of the piston 6 from the interior of the valve housing 25. The valve housing 25 has a port 30 connectable by a flexible pipe 31 to a coupling 32 in the closure plate 3, the coupling being connectable to a source of pressure fluid. The piston has a passage 33 through the peripheral wall thereof which opens the interior of the piston 6 to the interior of the servo-cylinder 1 on the closure plug side of the piston. The valve 26 and annular member 10 are arranged in relation to one another so that when the annular member 10 is moved against the spring loading acting thereon it contacts the valve 26 to displace the same from its seating 28 thus permitting pressure fluid to flow from the interior of the valve housing 25 to the interior of the servo-cylinder on the closure plug side of the piston 6, the piston 6 thus being displaced by the pressure fluid to the left in FIGURE 1. The interior of the servo-cylinder on the side of the piston opposite to the closure plug is open to atmosphere through a pipe 34 passing through the closure plate 3.

In use, the servo-device is installed with the connecting rod 21 associated with the annular member 10 coupled to the operator actuated means, the other connecting rod 15 being coupled to the means to be operated. As shown in FIGURE 1, in the non-operative position, the piston 6 is disposed towards the end of the cylinder through which the latter connecting rod 15 projects so as to be capable of a predetermined stroke. Upon operation of the operator actuated means, a pull is applied to the connecting rod 21 coupled to the annular member 10. The initial movement of this connecting rod results in axial movement of the annular member against the spring loading and relative to the piston such relative movement being sufficient to unseat the valve 26 to open the port 28 in the closed end wall 7 of the piston 6 whereby pressure fluid passes into the servo-cylinder and acts upon the end of the piston closed by the closure plug, the pressure acting over the full area of the piston less the area of the sleeve 17 extending outwardly from this end of the piston. The pressure fluid acting on the piston 6 assists the further axial displacement of the piston effected mechanically by the continued pull on the connecting rod 21 which causes the annular member 10 at the completion of the relative displacement to contact the interior surface of the closed end wall 7 of the piston. The displacement of the piston 6 results in corresponding axial movement of the connecting rod 15 coupled to the means to be operated whereby the required operation of such means is obtained. The pressure fluid passing from the valve to the cylinder acts on the annular member 10 to apply a reaction against the pull exerted by the operator so that the operator experiences resistance providing "feel" when operating the device.

As above referred to, the servo-device of the present invention is primarily intended for providing power assistance for the hand brakes of a road vehicle and for this purpose the servo-device is installed in the vehicle with the connecting rod 21 associated with the annular member coupled through a suitable linkage to the hand brake lever, the other connecting rod 15 being coupled to the brake actuating means directly associated with the brakes, a source of compressed air for example, connectable to the connector 32, being provided for the fluid pressure operation of the piston.

I claim:

1. A servo-device structure comprising a cylinder, a hollow piston slidably disposed therein, an end wall and a plug closing off the opposite ends of said piston and forming a hollow chamber, in said piston, an annular member slidably disposed in said member adjacent said end wall, a first biasing means normally urging said annular member away from said end wall and against said plug, said end wall being of substantially larger diameter than the remaining portion of said piston extending toward said plug, said piston portion forming an annular space with the inner surface of said cylinder, passage means in said piston in communication with said space and said chamber adjacent said end wall, said annular member and plug each having a central hemispherical recess in adjacent sides thereof and facing each other and providing socket joints, said end wall having a port therein in communication with said chamber and passage means, a valve housing projecting outwardly from said end wall and adjacent said port, a slidable valve disposed in said housing to close off said port, a valve seat on said end wall adjacent said port, a second biasing means normally urging said valve seated on said valve seat to close off said port, fluid supply means in said housing for supplying fluid under pressure to said port and passage means and annular space when said valve is opened to move said piston in said cylinder, an operator actuating rod extending through said housing, port and annular member and having a ball joint end on its end fitting into said annular member recess to provide a universal joint, a shoulder on said annular member adjacent said port adapted to unseat said valve when said rod is pulled to supply fluid pressure to said annular space and piston portion adjacent said plug, another rod extending through said plug and cylinder and having a ball joint end on its end fitting within said plug recess to provide a universal joint, said another rod being adapted to be connected to a brake actuating means.

2. The structure of claim 1 wherein said ball ends are held in said recesses by spring retaining rings.

3. The structure of claim 1 wherein there is provided a substantial annular space surrounding said rod and another rod extending through said annular member, valve housing cylinder and plug to permit substantial clearance of rods with respect to said first mentioned parts.

4. The structure of claim 1 wherein said valve consists of a sleeve with an outwardly extending flange adjacent said port, and sealing means are disposed around said flange.

5. The structure of claim 1 wherein said valve housing is integral with said piston.

References Cited by the Examiner
UNITED STATES PATENTS

| | | | |
|---|---|---|---|
| 1,890,010 | 12/32 | Vickers | 60—52 |
| 2,482,291 | 9/49 | Rush et al. | 91—376 |
| 2,997,028 | 8/61 | Ayers | 91—376 |
| 3,060,899 | 10/62 | May et al. | 91—376 |
| 3,104,590 | 9/63 | Kellogg et al. | 91—376 |

FRED E. ENGELTHALER, *Primary Examiner.*